US010926600B2

(12) United States Patent
Frasher et al.

(10) Patent No.: US 10,926,600 B2
(45) Date of Patent: *Feb. 23, 2021

(54) CHASSIS-BASED FORCE NULLIFICATION SYSTEMS AND METHODS FOR SEATED AND STANDING VEHICLE OCCUPANTS

(71) Applicant: Volvo Car Corporation, Gothenburg (SE)

(72) Inventors: Douglas Hall Frasher, Newbury Park, CA (US); Lawrence E. Abele, Camarillo, CA (US)

(73) Assignee: Volvo Car Corporation, Gothenburg (SE)

( * ) Notice: Subject to any disclaimer, the term of this patent is extended or adjusted under 35 U.S.C. 154(b) by 44 days.

This patent is subject to a terminal disclaimer.

(21) Appl. No.: 16/012,960

(22) Filed: Jun. 20, 2018

(65) Prior Publication Data

US 2019/0389269 A1    Dec. 26, 2019

(51) Int. Cl.
*B60G 17/016*    (2006.01)
*B60G 17/018*    (2006.01)
*B60G 17/019*    (2006.01)

(52) U.S. Cl.
CPC ....... *B60G 17/0162* (2013.01); *B60G 17/018* (2013.01); *B60G 17/01908* (2013.01); *B60G 2401/14* (2013.01)

(58) Field of Classification Search
CPC .............. B60G 17/0162; B60G 17/018; B60G 17/01908; B60N 2/501
See application file for complete search history.

(56) References Cited

U.S. PATENT DOCUMENTS 5,979,827 A    11/1999  Corcoran
6,026,920 A *  2/2000  Obeda ................. B60G 21/007
                                                                180/41
(Continued)

FOREIGN PATENT DOCUMENTS

DE    4201412 A1    7/1993
EP    1987982 A1    11/2008
(Continued)

OTHER PUBLICATIONS

Nov. 6, 2019 European Search Report issued on International Application 19180560.

*Primary Examiner* — Faye M Fleming
(74) *Attorney, Agent, or Firm* — Clements Bernard Walker; Christopher L. Bernard (57) ABSTRACT

System and method for nullifying one or more of lateral and longitudinal acceleration forces experienced by an occupant of a vehicle in a seated or standing position while the vehicle is traveling along a travel plane, including: a chassis structure; and an occupant cell one of coupled to and defined by the chassis structure; wherein one or more of the chassis and the occupant cell are configured to pivot one or more of: laterally at a longitudinal pivot point with respect to the travel plane; and longitudinally at a transverse pivot point with respect to the travel plane. Optionally, the chassis structure is configured to pivot one or more of laterally and longitudinally with respect to one or more wheel mechanisms operable for traveling over the travel plane. Optionally, the occupant cell is configured to pivot one or more of laterally and longitudinally with respect to the chassis structure.

20 Claims, 9 Drawing Sheets

(56) References Cited

U.S. PATENT DOCUMENTS

| | | | |
|---|---|---|---|
| 6,398,293 B1 * | 6/2002 | Nystrom | B60N 2/39 |
| | | | 180/89.14 |
| 6,755,270 B2 * | 6/2004 | Saarinen | B60N 2/14 |
| | | | 180/89.13 |
| 7,063,334 B2 | 6/2006 | Lim | |
| 8,240,758 B2 | 8/2012 | Combest | |
| 8,360,368 B2 * | 1/2013 | Bertrand | B64G 1/60 |
| | | | 244/171.9 |
| 9,321,321 B2 * | 4/2016 | Koumura | B60G 17/0161 |
| 9,738,086 B2 * | 8/2017 | Yoshida | B41J 2/1752 |
| 9,981,522 B2 * | 5/2018 | Kolb | B60G 15/12 |
| 10,046,677 B2 * | 8/2018 | Parker | B60N 2/38 |
| 2015/0123389 A1 | 5/2015 | Goss | |
| 2018/0057050 A1 * | 3/2018 | Takenaka | B62D 9/02 |
| 2018/0237065 A1 * | 8/2018 | Yamamoto | B60K 1/00 |
| 2018/0265158 A1 * | 9/2018 | Hara | B62K 5/08 |
| 2018/0290684 A1 * | 10/2018 | Suda | B62D 9/04 |
| 2019/0184867 A1 * | 6/2019 | Ketels | B60N 2/501 |

FOREIGN PATENT DOCUMENTS

| | | |
|---|---|---|
| WO | 20160127261 A1 | 8/2016 |
| WO | 2019105626 A1 | 6/2019 |

\* cited by examiner

CHASSIS-BASED FORCE NULLIFICATION SYSTEMS AND METHODS FOR SEATED AND STANDING VEHICLE OCCUPANTS

FIELD OF THE DISCLOSURE

The present disclosure relates generally to chassis and occupant cell-based force nullification systems and methods for seated and standing vehicle occupants. More specifically, the present disclosure relates to chassis and occupant cell-based force nullification systems and methods for seated and standing vehicle occupants that allow the occupant cell (or a portion thereof) and/or entire chassis to pivot laterally and/or longitudinally with respect to a travel plane, such as a road surface, as the vehicle subjects the occupant to lateral, longitudinal, and vertical forces. These systems and methods may be passive or active and provide enhanced occupant comfort during vehicular maneuvers, in both driver assist and autonomous applications.

BACKGROUND OF THE DISCLOSURE

A vehicle negotiating a roadway, for example, subjects a vehicle occupant to lateral, longitudinal, and vertical forces. These forces require the occupant to utilize his or her muscles to retain his or her upright posture, potentially resulting in discomfort and/or fatigue over time. Conventional vehicles designed primarily to maintain occupant comfort typically limit lateral and longitudinal accelerations to a maximum of about 0.3 g, allowing them to maintain safe and comfortable driving behavior relative to the surrounding environment and traffic. This is especially true of vehicles operating autonomously. Within this limit, the rigid chassis and occupant cell are designed to allow the occupant, whether seated or standing, to passively achieve a lean angle that balances lateral and/or longitudinal forces while negotiating a curve or hill, for example. Vertical forces are typically accommodated by conventional passive and active suspension systems, well known to those of ordinary skill in the art.

What are still needed in the art, however, are systems and methods that proactively nullify even these lower lateral and longitudinal accelerations such that occupant comfort is further enhanced. Such chassis and occupant cell-based force nullification systems and methods are provided by the present disclosure and may operate in a passive or active manner.

BRIEF SUMMARY OF THE DISCLOSURE

In various exemplary embodiments, the present disclosure provides chassis and occupant cell-based force nullification systems and methods for seated and standing vehicle occupants that allow the occupant cell (or a portion thereof) and/or entire chassis to pivot laterally and/or longitudinally with respect to a travel plane, such as a road surface, as the vehicle subjects the occupant to lateral, longitudinal, and vertical forces. These systems and methods utilize gravity to, in part, nullify lateral and/or longitudinal occupant accelerations, moving them to intermediate planes between pure lateral and/or longitudinal and pure vertical. Optionally, related to lateral acceleration, the systems and methods could allow the occupant, through the occupant cell and/or chassis, to rotate about a longitudinal pivot such that a resultant of the lateral and gravitational forces aligns with a line drawn between the virtual longitudinal pivot point and the center of mass of the rotatable body. Optionally, related to longitudinal acceleration, the systems and methods could allow the occupant, again through the occupant cell and/or chassis, to rotate about a transverse pivot such that a resultant of the longitudinal and gravitational forces aligns with a line drawn between the virtual transverse pivot point and the center of mass of the rotatable body. Vertical acceleration is dealt with via conventional passive and active suspension system principles, well known to those of ordinary skill in the art.

Although primarily road vehicles (such as cars, trucks, and the like) are used as illustrative examples herein, it will be readily apparent to those of ordinary skill in the art that the systems and methods of the present disclosure are equally applicable to marine, air, space, and other vehicle systems in the broadest sense.

In one exemplary embodiment, the present disclosure provides a system for nullifying one or more of lateral and longitudinal acceleration forces experienced by an occupant of a vehicle in a seated or standing position while the vehicle is traveling along a travel plane, the system including: a chassis structure; and an occupant cell one of coupled to and defined by the chassis structure; wherein one or more of the chassis structure and the occupant cell are configured to pivot one or more of: laterally at a longitudinal pivot point with respect to the travel plane; and longitudinally at a transverse pivot point with respect to the travel plane. Optionally, the chassis structure is configured to pivot one or more of laterally and longitudinally with respect to one or more wheel mechanisms operable for traveling over the travel plane. Optionally, the one or more wheel mechanisms each include one or more wheels that are configured to both rotate and pivot with respect to the chassis structure. Optionally, the occupant cell is configured to pivot one or more of laterally and longitudinally with respect to the chassis structure. The occupant cell includes one of a seated support and a standing support for the occupant. Preferably, the one or more of the chassis structure and the occupant cell are configured to pivot one or more of laterally and longitudinally within ±17 degrees from a perpendicular plane with respect to the travel plane. Optionally, the lateral pivot point and the longitudinal pivot point are virtual pivot points. Preferably, the lateral pivot point and the longitudinal pivot point are disposed substantially below a center of gravity of the occupant in the occupant cell. Optionally, the one or more of the chassis and the occupant cell are configured to pivot one or more of laterally and longitudinally with active assistance of one or more actuation mechanisms coupled to one or more controllers responsive to attitude/inclination feedback from one or more sensors. Alternatively, the one or more of the chassis and the occupant cell are configured to pivot one or more of laterally and longitudinally with active assistance of one or more actuation mechanisms coupled to one or more controllers responsive to attitude/inclination feedback from one or more cameras.

In another exemplary embodiment, the present disclosure provides a method for nullifying one or more of lateral and longitudinal acceleration forces experienced by an occupant of a vehicle in a seated or standing position while the vehicle is traveling along a travel plane, the method including: providing a chassis structure; providing an occupant cell one of coupled to and defined by the chassis structure; and pivoting one or more of the chassis structure and the occupant cell one or more of: laterally at a longitudinal pivot point with respect to the travel plane; and longitudinally at a transverse pivot point with respect to the travel plane. Optionally, the method further includes pivoting the chassis structure one or more of laterally and longitudinally with respect to one or more wheel mechanisms operable for traveling over the travel plane. Optionally, the one or more wheel mechanisms each include one or more wheels that are configured to both rotate and pivot with respect to the chassis structure. Optionally, the method further includes pivoting the occupant cell one or more of laterally and longitudinally with respect to the chassis structure. The occupant cell includes one of a seated support and a standing support for the occupant. Preferably, the method further includes pivoting the one or more of the chassis structure and the occupant cell one or more of laterally and longitudinally within ±17 degrees from a perpendicular plane with respect to the travel plane. Optionally, the lateral pivot point and the longitudinal pivot point are virtual pivot points. Preferably, the lateral pivot point and the longitudinal pivot point are disposed substantially below a center of gravity of the occupant in the occupant cell. Optionally, the one or more of the chassis and the occupant cell are pivoted one or more of laterally and longitudinally with active assistance of one or more actuation mechanisms coupled to one or more controllers responsive to attitude/inclination feedback from one or more sensors. Alternatively, the one or more of the chassis and the occupant cell are pivoted one or more of laterally and longitudinally with active assistance of one or more actuation mechanisms coupled to one or more controllers responsive to attitude/inclination feedback from one or more cameras.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
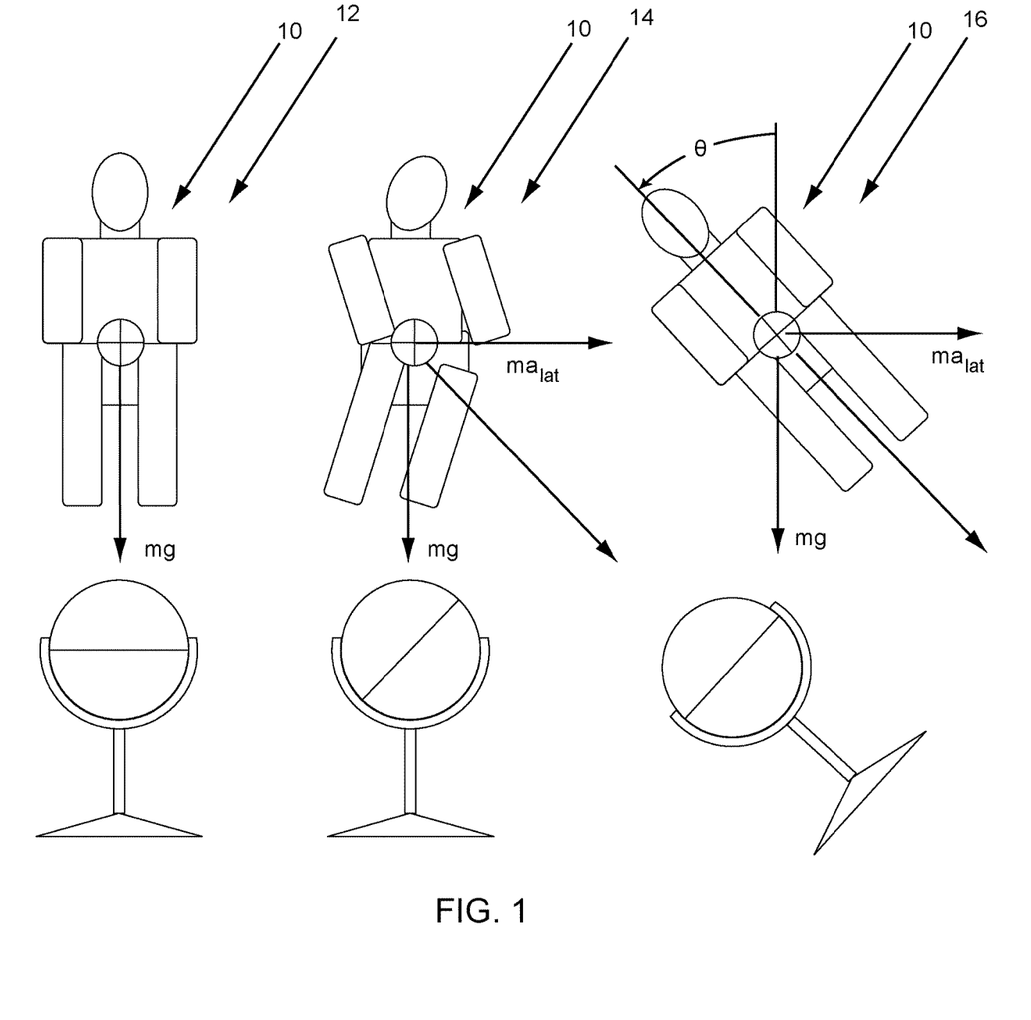
FIG. 1 is a schematic diagram illustrating the effect of lateral acceleration on a vehicle occupant and the operational principle of the present disclosure.

Referring now specifically to FIG. 1, a vehicle occupant 10 is illustrated experiencing no lateral acceleration 12, experiencing 1 g of lateral acceleration 14, and experiencing 1 g of lateral acceleration as nullified by the systems and methods of the present disclosure 16. With no lateral acceleration 12, only a vertical gravity force is present and acts upon the occupant 10, which the occupant 10 feels through his or her seating surface, if seated, or feet, if standing. With 1 g lateral acceleration 14, both a vertical gravity force and lateral acceleration force are present and act upon the occupant 10, both of which the occupant 10 feels through his or her seating surface, if seated, or feet, if standing, and through his or her posture-support muscles. The resultant force experienced by the occupant 10 lies between the vertical gravity force and the lateral acceleration force. With 1 g lateral acceleration and nullification 16, both a vertical gravity force and lateral acceleration force are again present and act upon the occupant, both of which the occupant 10 would feel through his or her seating surface, if seated, or feet, if standing, and through his or her posture-support muscles. Again, the resultant force experienced by the occupant 10 would lie between the vertical gravity force and the lateral acceleration force. However, the occupant 10 is allowed to pivot and lean at an angle, $\Theta$, such that his or her posture-support muscles are not taxed. The occupant 10 feels "heavier," but does not feel conventional side forces as a vehicle navigates a curve, for example. This is the same principle implicated by a leaning bicyclist or motorcycle rider. It is also the same principle that prevents a vehicle from sliding down a steeply banked curve. Lateral acceleration is negated, in part, using gravity.

Figure 2:
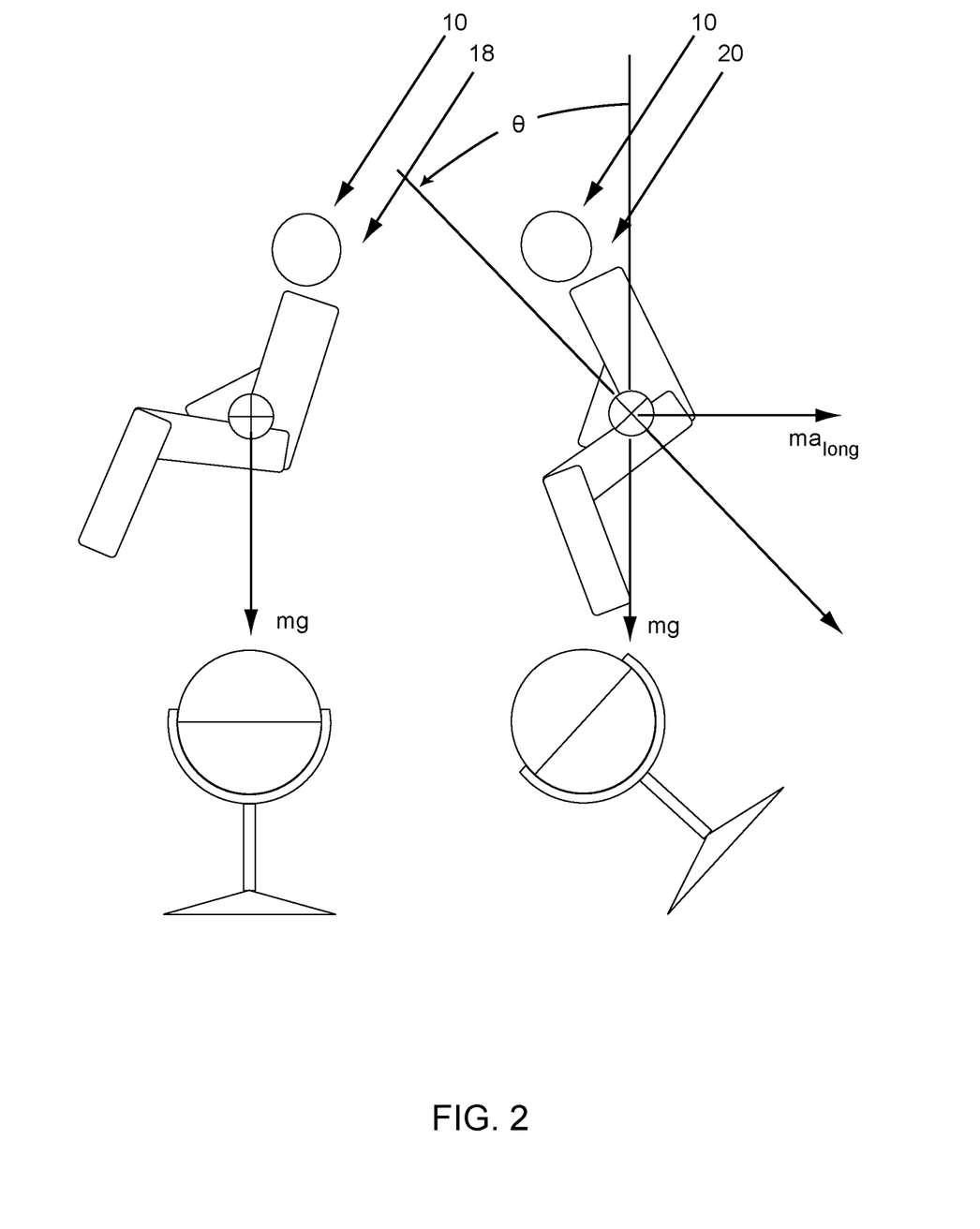
FIG. 2 is a schematic diagram illustrating the effect of longitudinal acceleration on a vehicle occupant and the operational principle of the present disclosure.

Referring now specifically to FIG. 2, a vehicle occupant 10 is illustrated experiencing no longitudinal acceleration 18 and experiencing 1 g of longitudinal acceleration as nullified by the systems and methods of the present disclosure 20. With no longitudinal acceleration 18, only a vertical gravity force is present and acts upon the occupant 10, which the occupant 10 feels through his or her seating surface, if seated, or feet, if standing. With 1 g longitudinal acceleration 20, both a vertical gravity force and longitudinal acceleration force are present and act upon the occupant, both of which the occupant 10 would feel through his or her seating surface, if seated, or feet, if standing, and through his or her posture-support muscles. The resultant force experienced by the occupant 10 would lie between the vertical gravity force and the longitudinal acceleration force. However, the occupant 10 is allowed to pivot and lean at an angle, $\Theta$, such that his or her posture-support muscles are not taxed. The occupant 10 feels "heavier," but does not feel conventional pitch forces as a vehicle navigates a rapid descent, for example. Longitudinal acceleration is negated, in part, using gravity.

Figure 3:
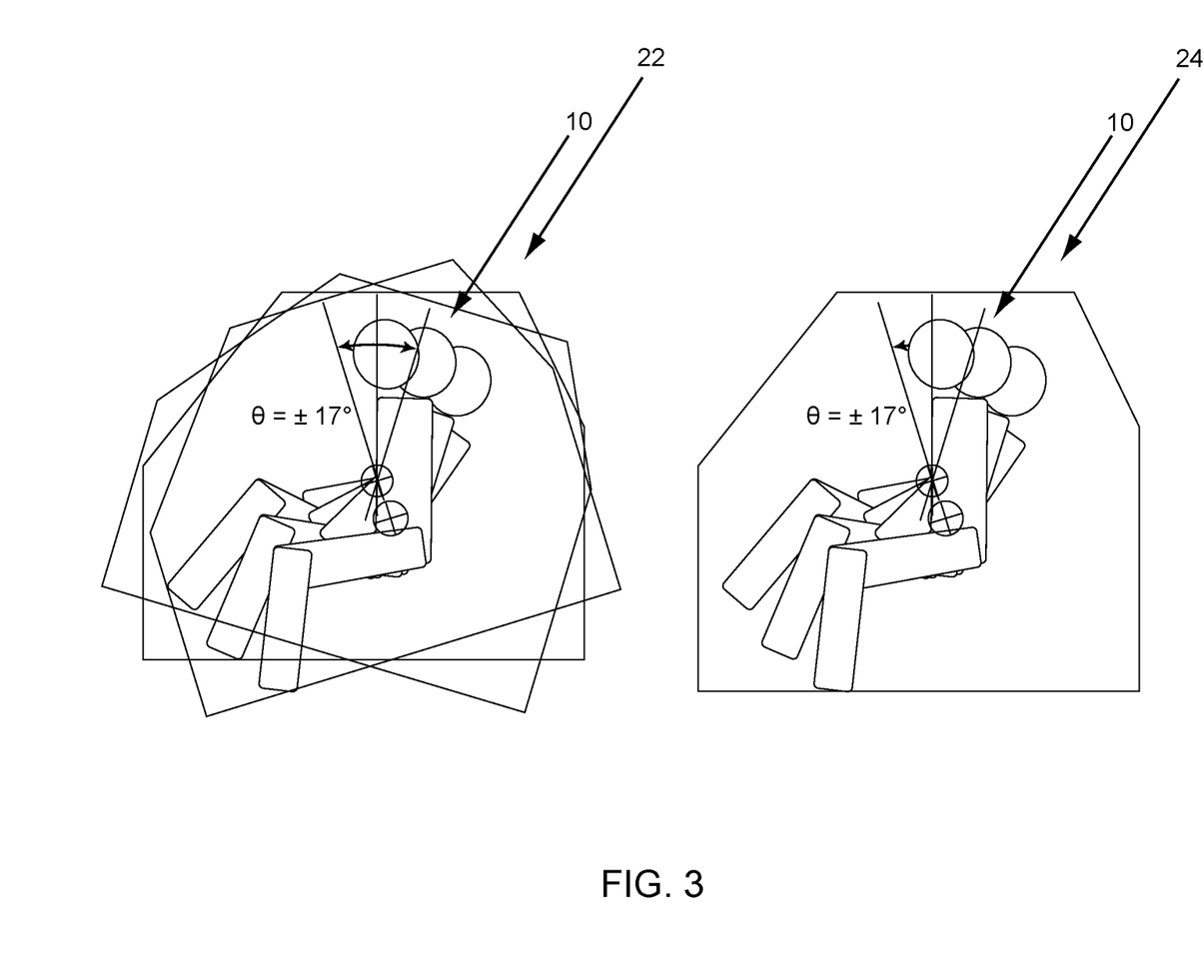
FIG. 3 is another schematic diagram illustrating the effect of longitudinal acceleration on a vehicle occupant and the operational principle of the present disclosure.

Referring now specifically to FIG. 3, as comfortable driving generates a maximum occupant longitudinal acceleration (for example) of 0.3 g, a useful maximum tilt angle is within about ±17 degrees. This rotation may be imparted to the occupant 10 through the occupant cell and/or chassis 22 (as described in greater detail herein), or through the occupant seat 24 (not described in greater detail herein). These configurations each present unique technical challenges.

Figure 4:
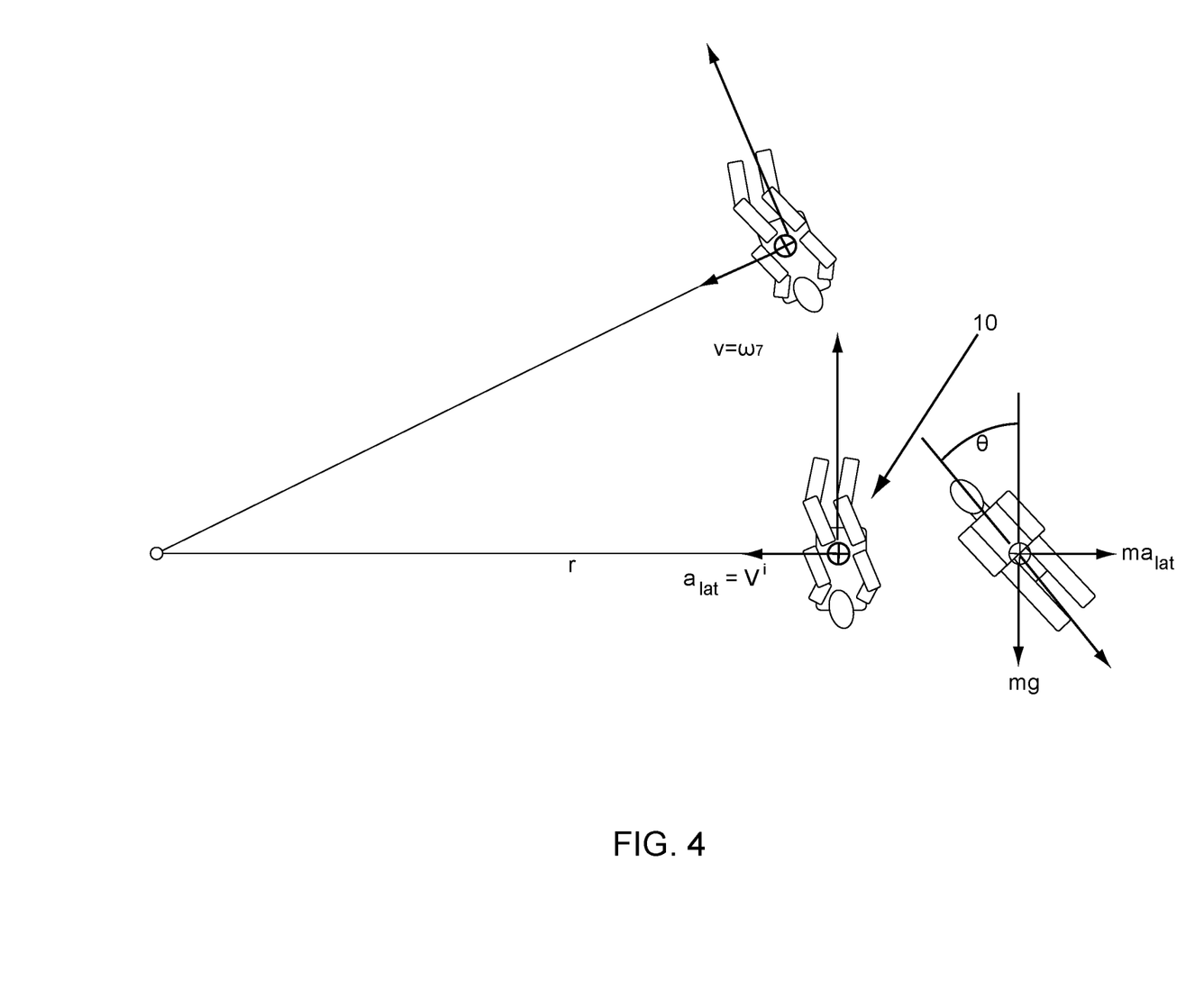
FIG. 4 is a schematic diagram illustrating the calculation of an optimal maximum occupant lateral (and/or longitudinal) lean angle for comfortable driving in accordance with the systems and methods of the present disclosure.

FIG. 4 illustrates the calculation of an optimal maximum occupant lateral (and/or longitudinal) lean angle, θ, for comfortable driving in accordance with the g-force nullifying systems and methods of the present disclosure.

$$\text{Lean Angle } \theta(\deg)=180/\pi * \tan^{-1}(ma_{lat}/mg)=180/\pi * \tan^{-1}(a_{lat}/g) \quad (1)$$

This figure shows approximately 1 g of lateral acceleration, giving a lean angle of 45 degrees. This would be required if the goal was related to achieving maximum cornering speed. The goal, however, is typically to achieve maximum comfort. Comfortable driving generates an approximate maximum lateral acceleration of 3.0 m/s². This gives a lean angle of:

$$\theta = \frac{180}{\pi} * \tan^{-1}\left(\frac{3.0}{9.81}\right) = 16.7 \text{ degrees.} \quad (2)$$

Figure 5:
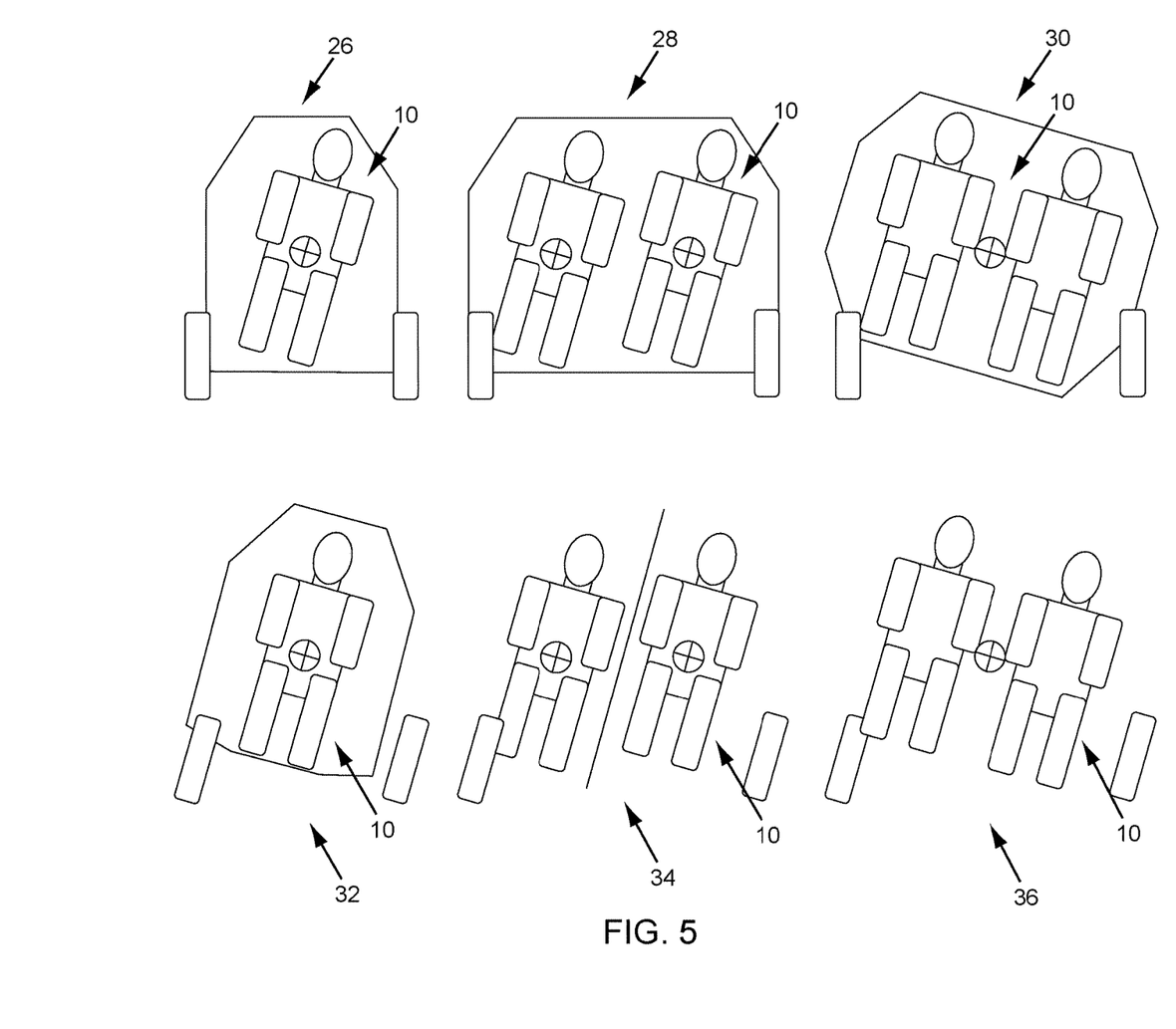
FIG. 5 is a schematic diagram illustrating a plurality of schemes for providing g-force nullifying lateral (and/or longitudinal) lean in accordance with the systems and methods of the present disclosure.

Referring now specifically to FIG. 5, there are several configurations that may be utilized to provide desired occupant lean, laterally, for example. Some of the same principles apply to longitudinal lean as well. The first and second configurations 26 and 28 lean the occupants 10 individually within the passenger compartment of a conventional chassis or the like, without correspondingly leaning the chassis. No significant benefit to tire load is provided. These configurations are not addressed in detail herein. The third configuration 30 leans the occupants 10 collectively within the passenger compartment of a conventional chassis or the like, without correspondingly leaning the chassis, such as by leaning the occupant cell or the like. Again, no significant to tire load is provided and imbalance difficulties may be encountered, as described in greater detail herein below. The fourth configuration 32 leans the occupant 10 by leaning the chassis and/or the occupant cell. As the tires lean as well, tire load benefit is provided. This is a focus of the present disclosure. The fifth configuration 34 leans the occupants 10 by leaning the chassis and/or the occupant cell. As the tires lean as well, tire load benefit is again provided. Here, however, to save space, the occupants 10 are allowed some vertical movement relative to one another, introducing some design and implementation complexity. The sixth configuration 36 leans the occupants 10 by leaning the chassis and/or the occupant cell. As the tires lean as well, tire load benefit is again provided. Here, however, the occupants 10 are allowed no vertical movement relative to one another, requiring extra space and introducing some imbalance concerns.

Figure 6:
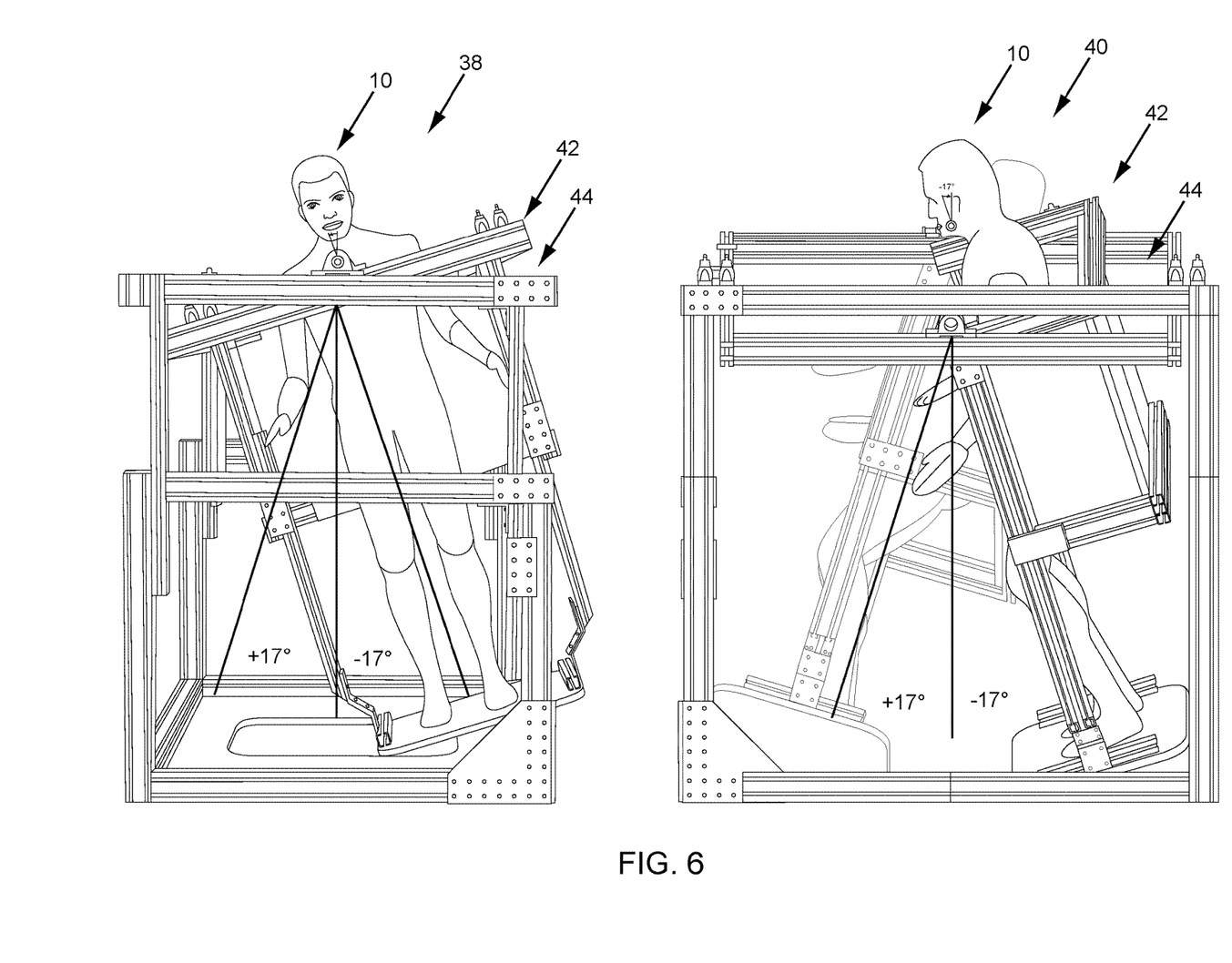
FIG. 6 is a series of perspective views of lateral and longitudinal test rigs demonstrating the operation of the concepts of the present disclosure.

FIG. 6 is a series of perspective views of lateral and longitudinal test rigs 38 and 40 demonstrating the operation of the concepts of the present disclosure. In both test rigs 38 and 40, the occupant cell 42 and/or chassis 44 is/are allowed to pivot up to ±17 degrees, correspondingly pivoting the occupant 10, laterally and/or longitudinally. In both directions, the center of rotation should be below the center of mass for the rotating body in order to enable passive rotation. This effectively creates a pendulum. The motion of the pendulum is well behaved if it finds equilibrium immediately in response to the lateral force/longitudinal force without overshoot or undershoot. Inertial effects and friction affect this behavior. Experiments suggest that the moment of inertia of a human body combined with a seat, for example, tend to give stable good behavior with pivot locations somewhere between 20-100 mm above/below the center of gravity. Some friction can be tolerated, but ideally is minimal. In many embodiments, that the lean provided is active lean, triggered by motion sensors or cameras that sense vehicle motion and implemented by a control system and servo mechanisms.

Again, in various exemplary embodiments, the present disclosure generally provides chassis or occupant cell-based force nullification systems and methods for seated or standing vehicle occupants that allow the occupant cell and/or entire chassis to pivot laterally and/or longitudinally with respect to a travel plane, such as a road surface, as the vehicle subjects the occupant to lateral, longitudinal, and vertical forces. These systems and methods utilize gravity to, in part, nullify lateral and/or longitudinal occupant accelerations, moving them to intermediate planes between pure lateral and/or longitudinal and pure vertical. Related to lateral acceleration, the systems and methods allow the occupant, through the occupant cell and/or chassis, to rotate about a longitudinal pivot such that a resultant of the lateral and gravitational forces aligns with a line drawn between the virtual longitudinal pivot point and the center of mass of the rotatable body. Related to longitudinal acceleration, the systems and methods allow the occupant, again through the occupant cell and/or chassis, to rotate about a transverse pivot such that a resultant of the longitudinal and gravitational forces aligns with a line drawn between the virtual transverse pivot point and the center of mass of the rotatable body. Vertical acceleration is dealt with via conventional passive and active suspension system principles.

Figure 7:
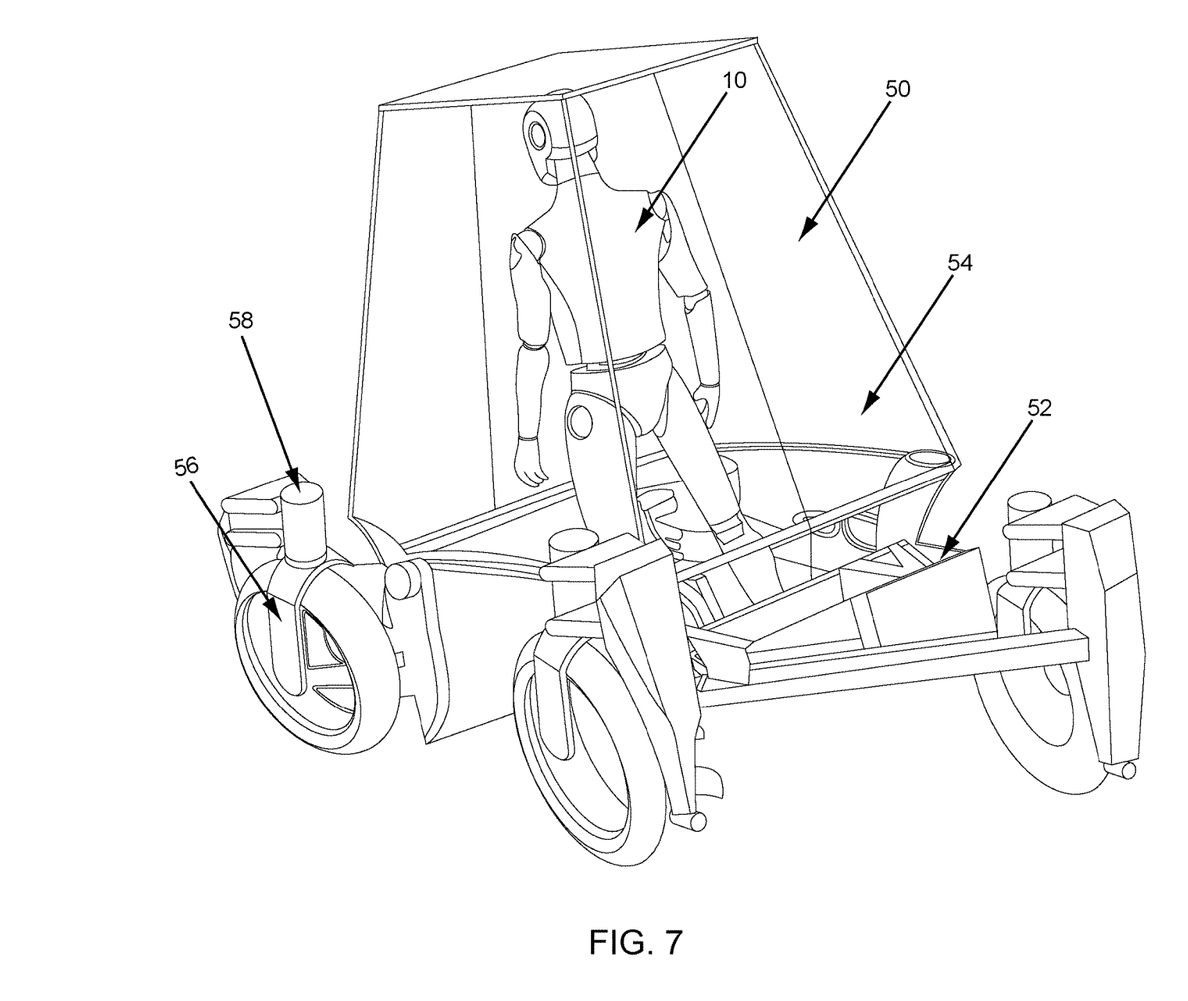
FIG. 7 is a perspective view of one exemplary embodiment of an omnidirectional chassis vehicle incorporating the g-force nullifying systems and methods of the present disclosure.

Referring now specifically to FIG. 7, in one exemplary embodiment, the omnidirectional vehicle 50 of the present disclosure consists of a chassis structure 52 and occupant cell 54 that are allowed to pivot in both lateral and longitudinal directions with respect to the road surface when the vehicle 50 turns, pitches, etc. The standing (or seated) occupant 10 pivots with the chassis structure 52 and/or occupant cell 54. Preferably, the longitudinal and transverse pivot points are located below the center of gravity of the occupant 10 such that passive pivoting is possible, although, in this exemplary embodiment, pivoting may be viewed as active. As is illustrated, lateral and longitudinal pivoting take place substantially simultaneously. Vertical displacement may be provided by conventional passive and/or active suspension systems, well known to those of ordinary skill in the art. The chassis structure 52 and/or occupant cell 54 pivot with respect to the wheels 56, which are coupled to strut structures 58 that allow them to lean into curves, for example. This leaning movement may be complex, such that both lateral and longitudinal occupant acceleration are nullified, within the limits described herein above.

Figure 8:
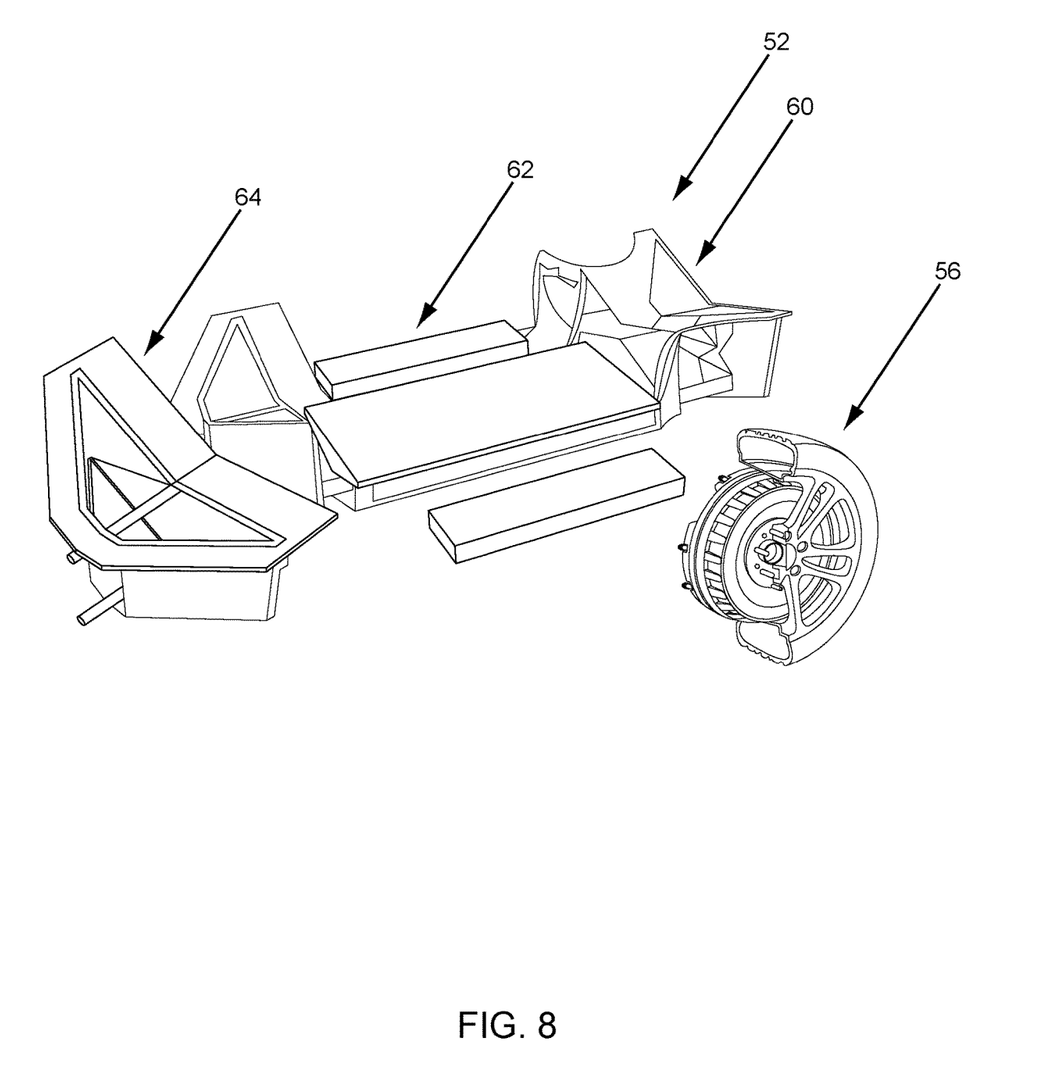
FIG. 8 is a perspective view of one exemplary embodiment of a frame structure of the omnidirectional chassis vehicle incorporating the g-force nullifying systems and methods of the present disclosure.

Referring now specifically to FIG. 8, the chassis structure 52 includes a frame structure 60. Preferably, this frame structure 60 is one-piece and is manufactured from a lightweight metallic material, a composite material, or another lightweight material that has sufficient strength and rigidity. The frame structure 60 is operable for holding batteries 62, in an electric or hybrid embodiment, and solid-state electronics 64. The omnidirectional pivoting wheel mechanisms 56 are rotatably, and optionally extensibly, coupled to the frame structure 60. The occupant cell 54 (FIG. 7) is also coupled to the frame structure 60.

Figure 9:
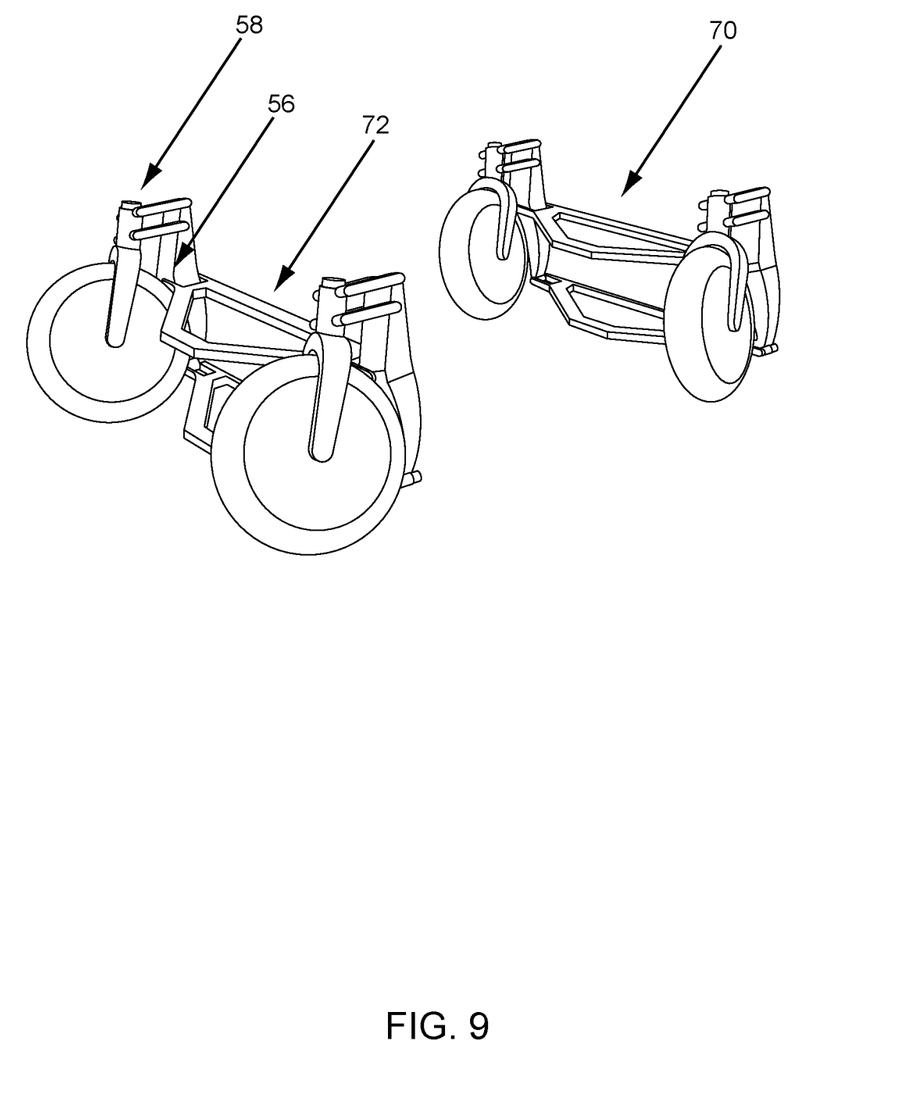
FIG. 9 is a perspective view of one exemplary embodiment of a wheel assembly of the omnidirectional chassis vehicle incorporating the g-force nullifying systems and methods of the present disclosure.

Referring now specifically to FIG. 9, the wheel assemblies 70 each include the wheels 56 and strut structures 58 described herein above, as well as any number of connecting structures 72, such as suspension members, anti-sway bars, equal-camber bars, etc., all well known to those of ordinary skill in the art. The wheel assemblies 70 generally provide 4-wheel steering and allow each wheel 56 to both rotate and lean, and optionally extend, thereby allowing the chassis to lean to nullify lateral and longitudinal acceleration forces from the occupant's perspective. Advantageously, this wheel movement further decreases tire loads while maneuvering.

Preferably, the active control software application of the present disclosure, when utilized, is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

The active suspension alluded to herein may include an active chassis with rear air suspension and "Four-C" technology. Providing comfort and handling advantages while automatically maintaining ride height, it allows a driver/occupant to adapt the chassis to his or her preferences. To ensure comfort and handling even if the vehicle is heavily loaded, the self-adapting air suspension for the rear wheels keeps the ride height constant. "Four-C" technology monitors the vehicle, road, and driver up to 500 times per second, simultaneously adjusting each shock absorber to current road and driving conditions to maximize both ride comfort and driving/riding pleasure. Three chassis settings allow the driver/occupant to adapt the suspension to his or her mood and current road conditions. In "Comfort" mode, the suspension is tuned for maximum comfort, while "Eco" mode optimizes the suspension for low fuel-consumption. "Dynamic" mode enhances the vehicle's sporty characteristics with firmer, more dynamic suspension.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A system for nullifying one or more of lateral and longitudinal acceleration forces experienced by an occupant of a vehicle in a seated or standing position while the vehicle is traveling along a travel plane, the system comprising:
    a chassis structure; and
    an occupant cell one of coupled to and defined by the chassis structure, wherein the occupant cell comprises one of a seated support and a standing support for the occupant;
    wherein one or more of the chassis structure and the occupant cell are configured to pivot one or more of:
        laterally at a longitudinal pivot point with respect to the travel plane; and
        longitudinally at a transverse pivot point with respect to the travel plane; and
    wherein the one or more of the chassis and the occupant cell are configured to pivot one or more of laterally and longitudinally with active assistance of one or more actuation mechanisms coupled to one or more controllers responsive to feedback from one or more cameras.

2. The system of claim 1, wherein the chassis structure is configured to pivot one or more of laterally and longitudinally with respect to one or more wheel mechanisms operable for traveling over the travel plane.

3. The system of claim 2, wherein the one or more wheel mechanisms each comprise one or more wheels that are configured to both rotate and pivot with respect to the chassis structure.

4. The system of claim 1, wherein the occupant cell is configured to pivot one or more of laterally and longitudinally with respect to the chassis structure.

5. The system of claim 1, wherein the one or more of the chassis structure and the occupant cell are configured to pivot one or more of laterally and longitudinally within ±17 degrees from a perpendicular plane with respect to the travel plane.

6. The system of claim 1, wherein the lateral pivot point and the longitudinal pivot point are virtual pivot points.

7. The system of claim 1, wherein the lateral pivot point and the longitudinal pivot point are disposed substantially below a center of gravity of the occupant in the occupant cell.

8. The system of claim 1, wherein the one or more of the chassis and the occupant cell are configured to pivot one or more of laterally and longitudinally with active assistance of the one or more actuation mechanisms coupled to the one or more controllers responsive to feedback from one or more sensors.

9. The system of claim 1, wherein the one or more of the chassis and the occupant cell are configured to pivot one or more of laterally and longitudinally via tilting of one or more wheels of the vehicle.

10. The system of claim 9, wherein the one or more wheels of the vehicle are configured to simultaneously tilt and steer the vehicle.

11. A method for nullifying one or more of lateral and longitudinal acceleration forces experienced by an occupant of a vehicle in a seated or standing position while the vehicle is traveling along a travel plane, the method comprising:
providing a chassis structure;
providing an occupant cell one of coupled to and defined by the chassis structure, wherein the occupant cell comprises one of a seated support and a standing support for the occupant; and
pivoting one or more of the chassis structure and the occupant cell one or more of:
laterally at a longitudinal pivot point with respect to the travel plane; and
longitudinally at a transverse pivot point with respect to the travel plane; and
wherein the one or more of the chassis and the occupant cell are pivoted one or more of laterally and longitudinally with active assistance of one or more actuation mechanisms coupled to one or more controllers responsive to feedback from one or more sensors.

12. The method of claim 11, further comprising pivoting the chassis structure one or more of laterally and longitudinally with respect to one or more wheel mechanisms operable for traveling over the travel plane.

13. The method of claim 12, wherein the one or more wheel mechanisms each comprise one or more wheels that are configured to both rotate and pivot with respect to the chassis structure.

14. The method of claim 11, further comprising pivoting the occupant cell one or more of laterally and longitudinally with respect to the chassis structure.

15. The method of claim 11, further comprising pivoting the one or more of the chassis structure and the occupant cell one or more of laterally and longitudinally within ±17 degrees from a perpendicular plane with respect to the travel plane.

16. The method of claim 11, wherein the lateral pivot point and the longitudinal pivot point are virtual pivot points.

17. The method of claim 11, wherein the lateral pivot point and the longitudinal pivot point are disposed substantially below a center of gravity of the occupant in the occupant cell.

18. The method of claim 11, wherein the one or more of the chassis and the occupant cell are pivoted one or more of laterally and longitudinally with active assistance of the one or more actuation mechanisms coupled to the one or more controllers responsive to feedback from one or more sensors.

19. The method of claim 11, wherein the one or more of the chassis and the occupant cell are configured to pivot one or more of laterally and longitudinally via tilting of one or more wheels of the vehicle.

20. The method of claim 10, wherein the one or more wheels of the vehicle are configured to simultaneously tilt and steer the vehicle.

* * * * *